(12) United States Patent
Tsai

(10) Patent No.: US 9,793,726 B2
(45) Date of Patent: Oct. 17, 2017

(54) WIRELESS POWER TRANSMISSION SYSTEM

(71) Applicant: Hsiung-Kuang Tsai, Taipei (TW)

(72) Inventor: Hsiung-Kuang Tsai, Taipei (TW)

(73) Assignee: SLIM HMI TECHNOLOGY, Taipei (TW)

( * ) Notice: Subject to any disclaimer, the term of this patent is extended or adjusted under 35 U.S.C. 154(b) by 336 days.

(21) Appl. No.: 13/773,564

(22) Filed: Feb. 21, 2013

(65) Prior Publication Data
US 2013/0229063 A1 Sep. 5, 2013

(30) Foreign Application Priority Data
Mar. 2, 2012 (TW) .............................. 101107090 A

(51) Int. Cl.
| | | |
|---|---|---|
| H02J 7/00 | (2006.01) | |
| H04B 5/00 | (2006.01) | |
| H02J 7/02 | (2016.01) | |
| H02J 5/00 | (2016.01) | |

(52) U.S. Cl.
CPC ............ *H02J 7/0042* (2013.01); *H02J 7/025* (2013.01); *H04B 5/0012* (2013.01); *H04B 5/0037* (2013.01); *H04B 5/0075* (2013.01); *H02J 5/005* (2013.01)

(58) Field of Classification Search
CPC ...... H02J 5/00; H02J 7/00; H02J 7/025; H02J 5/005; H04M 1/0268; H04B 5/0012; H04B 5/0075
See application file for complete search history.

(56) References Cited

U.S. PATENT DOCUMENTS

| | | | | |
|---|---|---|---|---|
| 6,885,345 | B2 * | 4/2005 | Jackson ................... | H01Q 3/40 343/700 MS |
| 7,119,787 | B2 * | 10/2006 | Yamaguchi ............ | G09G 3/344 345/103 |
| 7,355,783 | B2 * | 4/2008 | Schmitz ........................ | 359/296 |
| 7,764,235 | B2 * | 7/2010 | Matsunaga ............ | 343/700 MS |
| 8,220,719 | B2 * | 7/2012 | Johnson, Jr. ......... | G06Q 20/204 235/492 |
| 8,339,096 | B2 * | 12/2012 | Osada .......................... | 320/108 |
| 8,525,370 | B2 * | 9/2013 | Walley et al. ................. | 307/104 |
| 2004/0189625 | A1 * | 9/2004 | Sato ................. | G06K 19/07749 345/204 |

(Continued)

FOREIGN PATENT DOCUMENTS

| | | |
|---|---|---|
| CN | 101694769 A | 4/2010 |
| CN | 102246222 A | 11/2011 |

(Continued)

OTHER PUBLICATIONS

Liu, "a generalized coupling model for Capacitive Power Transfer systems," 36th Annual COnference on IEEE Industrial Electronics Society, Nov. 7-10, 2010, pp. 274-279.*

(Continued)

*Primary Examiner* — Thienvu Tran
*Assistant Examiner* — Pinping Sun
(74) *Attorney, Agent, or Firm* — Cheng-Ju Chiang

(57) ABSTRACT

A wireless power transmission system includes an electronic device and an array display device. The array display device includes a display surface and an array substrate. The array substrate has a substrate and an array which is disposed at one side of the substrate. The array substrate emits an electric power signal coupled to the electronic device from the display surface. The electronic device manages the electric power signal for operation.

17 Claims, 7 Drawing Sheets

(56) References Cited

U.S. PATENT DOCUMENTS

| | | | | |
|---|---|---|---|---|
| 2006/0113905 | A1* | 6/2006 | Nakamura | 313/511 |
| 2008/0258679 | A1* | 10/2008 | Manico | H02J 7/025 320/106 |
| 2009/0039828 | A1* | 2/2009 | Jakubowski | H02J 7/025 320/106 |
| 2009/0072629 | A1* | 3/2009 | Cook | H02J 17/00 307/104 |
| 2010/0087143 | A1* | 4/2010 | Bonin | H02J 5/00 455/41.1 |
| 2010/0259217 | A1 | 10/2010 | Baarman et al. | |
| 2010/0289341 | A1* | 11/2010 | Ozaki et al. | 307/104 |
| 2011/0057891 | A1* | 3/2011 | Ham | H02J 7/0021 345/173 |
| 2011/0133691 | A1* | 6/2011 | Hautanen | H02J 7/0004 320/108 |
| 2012/0303980 | A1* | 11/2012 | Culbert | G06F 1/26 713/300 |

FOREIGN PATENT DOCUMENTS

| | | |
|---|---|---|
| EP | 2365698 A2 | 9/2011 |
| TW | M397649 U1 | 2/2011 |
| WO | 2011/095841 A2 | 8/2011 |

OTHER PUBLICATIONS

Sekitani, et al., "A large-area wireless power-transmission sheet using printed organic transistors and plastic MEMS switches," Apr. 29, 2007, Nature, vol. 6, pp. 413-417.*

* cited by examiner

WIRELESS POWER TRANSMISSION SYSTEM

CROSS REFERENCE TO RELATED APPLICATIONS

This Non-provisional application claims priority under 35 U.S.C. §119(a) on Patent Application No(s). 101107090 filed in Taiwan, Republic of China on Mar. 2, 2012, the entire contents of which are hereby incorporated by reference.

BACKGROUND OF THE INVENTION

Field of Invention

The invention relates to a wireless power transmission system.

Related Art

In recent years, touch panels have been gradually and widely used in consumer electronic devices such as smart phones, digital cameras, MP3 players, PDAs, GPS, handheld PC, and ultra mobile PC (UMPC). A touch panel is combined with a display to form a touch-sensitive display device.

On the other hand, in view of the convenience of portable electronic devices, charging devices for portable electronic devices, such as solar charging devices for Bluetooth earphones and solar charging devices for mobile phones, have been developed. Portable electronic devices in the prior art are electrically connected with batteries or charging adaptor through connectors to perform charging, which results in that openings must be formed in the housings of the portable electronic devices for the connectors. The exposed connector or even an internal circuit may be affected by moisture through the opening formed in the housing since moisture is known to cause malfunction of electronic components. For example, a mobile phone is provided with a power jack for connecting with a charger to charge the mobile phone, and moisture can contact internal components through the charging connector. Furthermore, it is easy for a connector or a portable electronic device to be damaged when users plug or unplug the connector.

In another occasion, the electronic label of merchandise not only can provide the customers different shopping experience but also can enhance the efficiency of cooperate operation. However, one major obstacle to deploy the electronic label is the source of electric power. A setup that can compatible with existing shelf or warehouse without extra wiring for power can help to prevail the application of electronic label.

Moreover, recently the stylus input for human-machine interface has been developed rapidly. When the design of the pen is of an active type, how to achieve both a streamlined appearance and a power source for long-term usage is also an important issue while promoting stylus input.

Therefore, this invention is to provide a wireless power transmission system configured in a display device. The system uses the display device to transmit power to other electronic devices to enhance the charging convenience and reduce the use of the connector, thereby reducing costs, saving energy and protecting the environment.

SUMMARY OF THE INVENTION

In view of the foregoing, an objective of the invention is to provide a wireless power transmission system configured in a display device. The system uses the display device to transmit power to the electronic devices to enhance the charging convenience and reduce the use of the connector, thereby reducing costs, saving energy and protecting the environment.

To achieve the above objective, a wireless power transmission system comprises an electronic device and an array display device. The array display device comprises a display surface and an array substrate having a substrate and an array. The array is disposed at one side of the substrate and comprises an array of electrodes. The array substrate emits an electric power signal, which couples to the electronic device from the display surface. The electric power signal provides the energy for the operation of the electronic device.

In one embodiment, the electric power signal is coupled from the array substrate to the electronic device by capacitive or inductive coupling.

In one embodiment, the electronic device has a receiving unit for receiving the electric power signal. The receiving unit has a coil or a capacitor, the electric power signal couples from the display surface to the coil or the capacitor.

In one embodiment, the coupling distance between the electronic device and the array display device is less than 1 meter.

In one embodiment, the display surface is located at another side of the substrate.

In one embodiment, the wireless power transmission system further comprises a mode-triggering module. A user or the electronic device triggers the mode-triggering module to activate the array display device to enter into an operation mode to transmit the electric power signal.

In one embodiment, the mode-triggering module is disposed at the array display device.

In one embodiment, the mode-triggering module is disposed at the electronic device.

In one embodiment, the array further comprises a plurality of row electrodes and a plurality of column electrodes. The row electrodes and the column electrodes are intersected, and the electric power signal is transmitted from at least one of the row electrodes or at least one of the column electrodes.

In one embodiment, the array substrate further comprises at least an electrode disposed outside of the array to transmit the electric power signal.

As mentioned above, the invention, the wireless power transmission system, includes an array display device and an electronic device. The array display device couples the electric power signal from its display surface to the electronic device so that the electric power signal provides energy for the operation of electronic devices. In more detail, the electric power signal is coupled from the array substrate of the array display device to the electronic device through capacitive or inductive coupling. The electronic device receives the electric power signal through the receiving unit and transforms the electric power signal into a power source for direct use or as a power source for charging through an internal control circuit.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description proceeded with reference to the accompanying drawings. Wherein the same reference relates to the same element.

Figure 1:
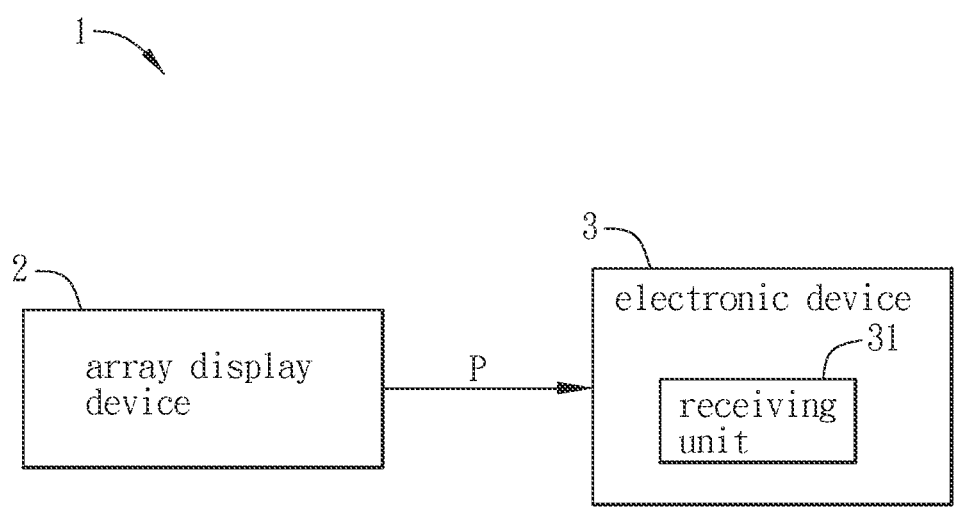
FIG. 1 is a schematic block diagram showing a wireless power transmission system according to a preferred embodiment of the invention.

FIG. 1 is a schematic block diagram showing a wireless power transmission system 1 according to a preferred embodiment of the invention. The wireless power transmission system 1 includes an array display device 2 and an electronic device 3. The array display device 2 and the electronic device 3 are coupled via, for example, capacitive or inductive coupling so that an electric power signal P can be transmitted from the array display device 2 to the electronic device 3 in a non-contact connection manner. The electric power signal P provides the energy for the operation of electronic device 3. Therefore, it is called a wireless power transmission. In the present embodiment, the array display device 2 is, for example, a liquid-crystal display device, an organic light-emitting diode display device, a light-emitting diode display device, an electrophoretic display device, an electronic label or a micro-electromechanical (MEMS) display device. The electronic device 3 is, for example, a mobile communication device, a multimedia playback device, am image capture device, a tablet computer, a pen for stylus input, an electronic label or other portable electronic devices.

Figure 2A:
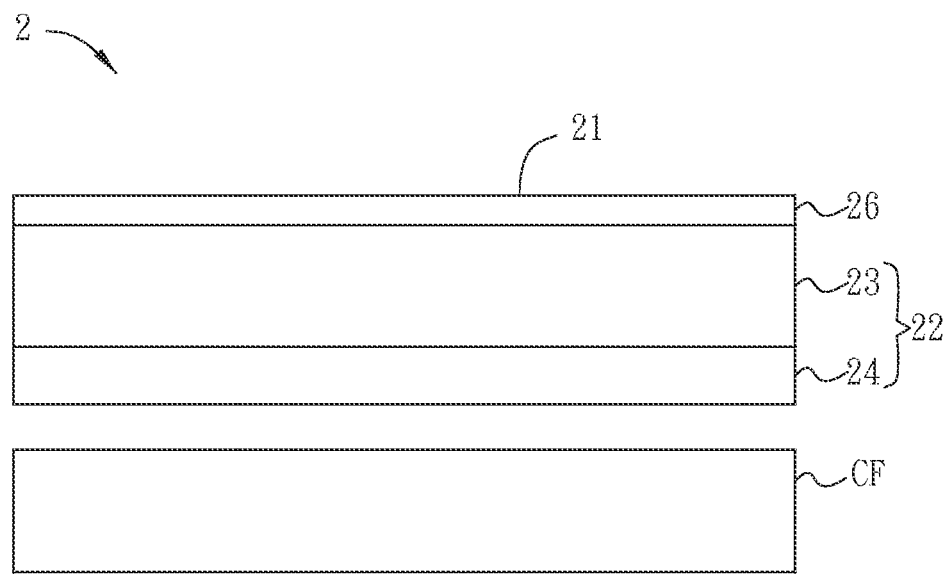
FIG. 2A is a side view of the array display device according to a preferred embodiment of the invention.

FIG. 2A is a side view of the array display device 2 according to a preferred embodiment of the invention. The array display device 2 includes a display surface 21 and an array substrate 22. The array substrate 22 includes a substrate 23 and an array 24. The array 24 is provided on one side of the substrate 23, and the display surface 21 is located on another side of the substrate 23. The display surface 21 refers to the surface of the array display device 2 closest to a user when the user is viewing the display image of the array display device 2.

Figure 2B:
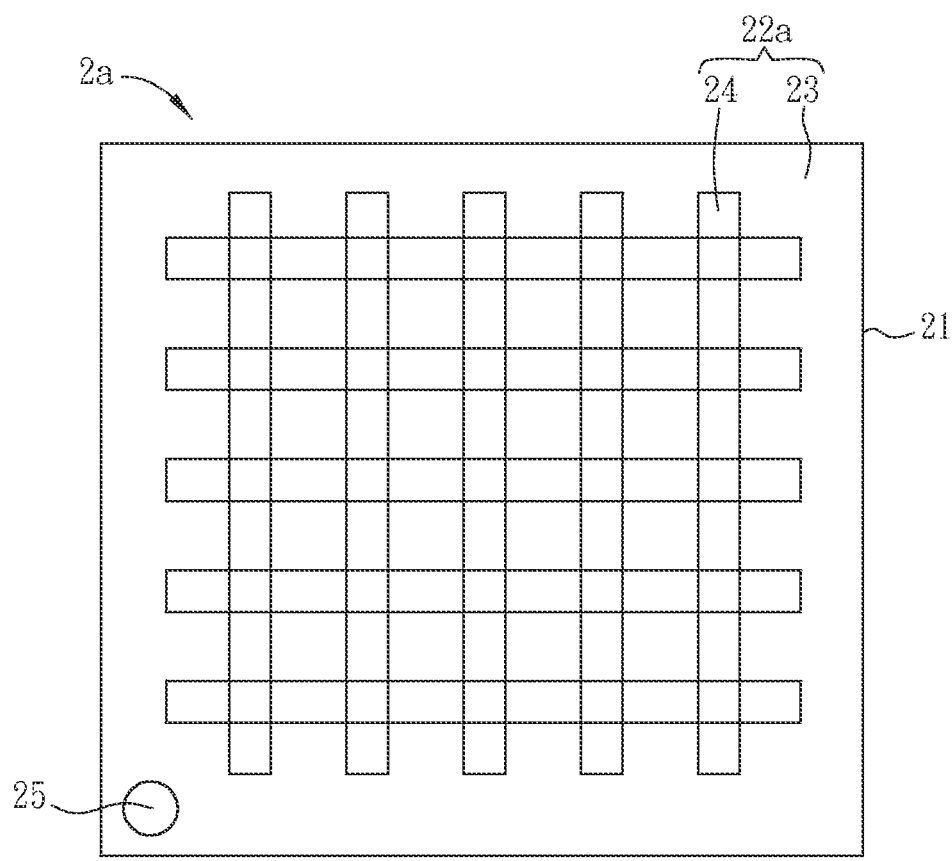
FIG. 2B is a top view of the array display device according to another preferred embodiment of the invention.

FIG. 2B is a top view of an array display device 2a according to another preferred embodiment of the invention. The array display device 2a includes a display surface 21 and an array substrate 22a. The array substrate 22a is different from the above-described embodiment in that in addition to the substrate 23 and the array 24, it further includes at least an electrode 25. The array 24 and the electrode 25 are located on one side of the substrate 23, while the display surface 21 is located on another side of the substrate 23. Wherein, the electrode 25 is outside of the array 24 and emits electric power signals. The array substrate 22a of the present embodiment may be, for example, a thin-film transistor substrate in a conventional liquid crystal display device, wherein the electrode 25 is an electrode located outside the transistor array and is driven by a driving circuit (not shown).

As shown in FIG. 2A, the array display device 2 of the present embodiment is, for example, a liquid crystal display device, and may further include a color filter substrate CF. The color filter substrate CF is provided adjacent to one side of the array substrate 22, having the array 24, and is provided opposite to the array substrate 22. Compared to the array substrate in the liquid crystal display device in the prior art, the array display device 2 in the present embodiment is inverted, that is, the substrate 23 of the array substrate 22 is used as the display surface 21 close to the user to facilitate the coupling of the electric power signal P between the array display device 2 and the electronic device 3. The color filter substrate CF is provided at the side facing away from the user. In the present embodiment, the array display device may further include a protective glass 26 provided at the side of the substrate 23 opposite to the array 24, while the display surface 21 is the surface of the protective glass 26 that is close to the user. Furthermore, the side of the substrate 23 close to the protective glass 26 includes other components, such as optical film, metal frame, etc. Moreover, in other embodiments, if the array display device 2 is an electronic paper, the array display device 2 may further include an electrophoretic material (not shown) disposed at the side of the array substrate 22 having the array 24.

In the present embodiment, the array substrate 22 refers to those having a pixel array, such as a liquid crystal display panel, an organic light-emitting diode panel, a light-emitting diode panel, an electrophoretic display panel, an electronic label, or a micro-electromechanical display panel. Wherein, the array 24 may include a plurality of column electrodes, a plurality of row electrodes, and/or a plurality of pixel electrodes, while the column electrodes and the row electrodes are intersected. In addition, the array 24 may be an active array or an array of electrodes of a passive array type display. Here the array 24 is an active array, for example, which may further include a plurality of transistors, and the transistors are electrically connected with the column electrodes, the row electrodes, and the pixel electrodes.

It is noteworthy that if the column electrodes and the row electrodes of the pixel array are used to transmit electric power signal P, the transmission and coupling may be done after the end of a frame of the array display device 2 or before the end of the frame. In other words, the array display device 2 may start transmitting the electric power signal P to the electronic device 3 after the end of a video frame and before the start of the next frame, or during the period of a frame. It should be noted that, if the transmission of the electric power signal is performed through the electrodes outside the pixel array, it would be unnecessary to coordinate with the transmission time of the frame.

Furthermore, when the transmission of the electric power signal P to the electronic device 3 is completed, the array display device 2 may at least display a complete or a portion of a frame. In other words, the end of the transmission of the electric power signal P may be located after the end of a frame and before the start of the next frame, or during the period of displaying a frame, which is not limited herein. Moreover, before starting the transmission of the electric power signal P, the array display device 2 may use at least one frame to display a message that the process of transmission of the electric power signal P is ready to go. After the end of the transmission of the electric power signal P, the array display device 2 may also use at least one frame to display a message that the process of transmission of the electric power signal P is finished. In other words, before the start of the transmission of the first electric power signal P and/or after the end of the transmission of the last electric power signal P, the array display device 2 may display a reminding picture to remind the user. Additionally, during the period of the transmission of the electric power signal P, the array display device 2 may also display a picture to mark the region of the electrodes for power transmissions on the display to facilitate the user to perform signal coupling.

According to the invention, the structure of the wireless power transmission system 1 will be described below with reference to the drawings above (FIG. 1 to FIG. 2A). A thin-film transistor substrate (TFT substrate) of a liquid crystal display will be used as an example to explain how the array substrate 22 transmits the electric power signal from the column electrodes or the row electrodes of the array display device 2 to the electronic device 3.

Figure 3:
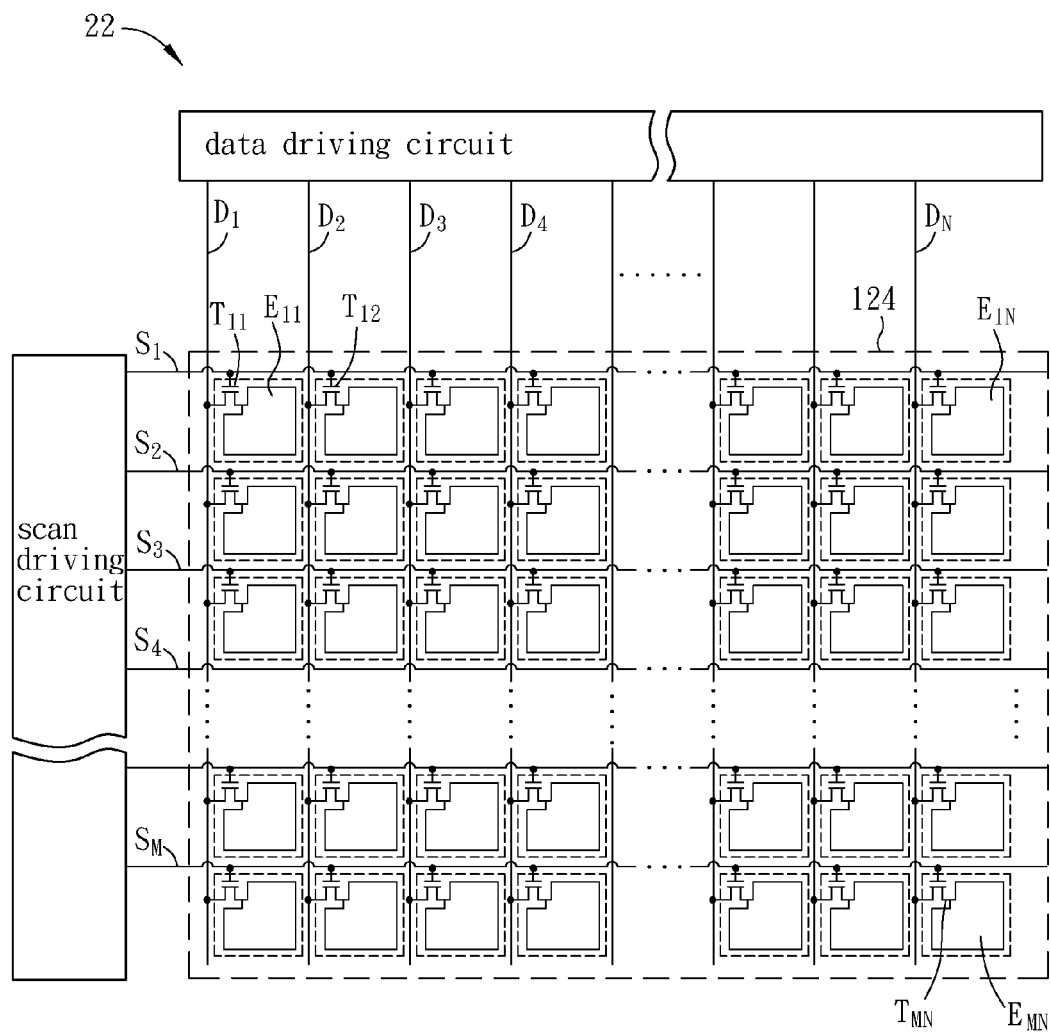
FIG. 3 is a schematic diagram of the thin-film transistor substrate used in a preferred embodiment of the invention.

FIG. 3 is a schematic diagram of the thin-film transistor substrate used in a preferred embodiment of the invention. Please refer to both FIG. 2A and FIG. 3, the array 24 may include a plurality of row electrodes $S_1 \sim S_M$, a plurality of column electrodes $D_1 \sim D_N$, and a plurality of pixel electrodes $E_{11} \sim E_{MN}$. The row electrodes $S_1 \sim S_M$ and the column electrodes $D_1 \sim D_N$ are intersected and are substantially perpendicular to each other or at an angle. In addition, the array 24 may further include a plurality of transistors $T_{11} \sim T_{MN}$. The transistors $T_{11} \sim T_{MN}$ are electrically connected with the row electrodes $S_1 \sim S_M$, the column electrodes $D_1 \sim D_N$, and the pixel electrodes $E_{11} \sim E_{MN}$, respectively. Here, the row electrodes $S_1 \sim S_M$ are scan lines for example, the column electrodes $D_1 \sim D_N$ are data lines for example. Of course, the row electrodes $S_1 \sim S_M$ may be used as data lines, while the column electrodes $D_1 \sim D_N$ are scan lines.

Furthermore, the substrate 23 may further be provided with a driving module, which includes a data driving circuit, a scan driving circuit, a timing control circuit (not shown), and a gamma correction circuit (not shown), so that the liquid crystal display panel can display image through the drive of the driving module. Since to drive an image using a driving module is a prior art technology, the descriptions are omitted herein. Furthermore, the array substrate of the aspect is for exemplary purpose only and is not intended to limit the invention. The key point of this embodiment is to use at least one of the row electrodes $S_1 \sim S_M$ and/or column electrodes $D_1 \sim D_N$ to transmit electric power signal P from the array substrate 22 to the electronic device 3.

In the present embodiment, in addition to transmit the display data signals of an ordinary frame, the column electrodes $D_{11} \sim D_N$ may further be used to transmit electric power signal P. For example, an electric power signal P having a frequency higher than the frequency of the display signal is superimposed onto the display data signal or during a vacant time slot of display data signal transmission, such as the time slot after all the scans of the row electrodes $S_1 \sim S_M$ are completed in a frame and before the start scanning of next frame (the vacant time slot between frames); after the completion of one row electrode scan and before the start of the next row scan; within the scan period of each row electrode via shortening the display data signal and before the transmission of the display data signal, etc. Here, the electric power signal P may be implemented by extending the functionality of timing control (T-con) and the data or scan driving circuit to simplify the overall circuit design.

Figure 4:
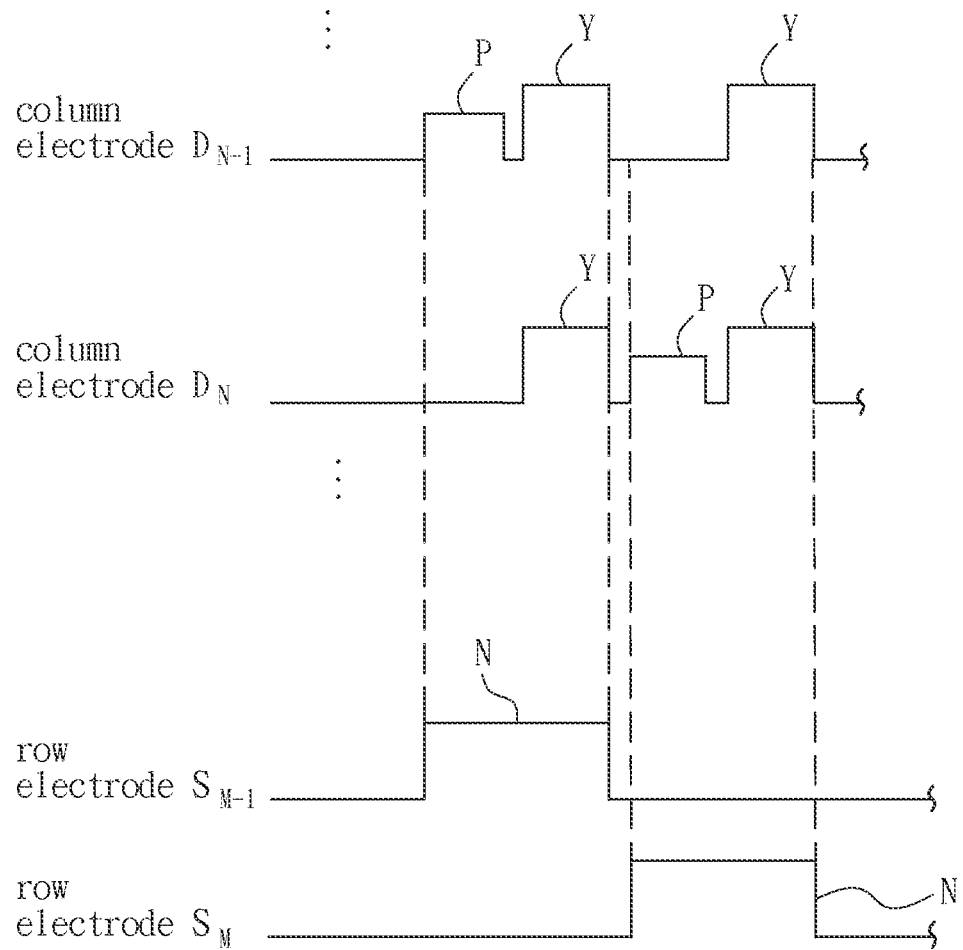
FIG. 4 is a schematic diagram showing the signals of the two row electrodes and two column electrodes of the thin-film transistor substrate shown in FIG. 3.

FIG. 4 is a schematic diagram showing the signals of the two neighboring row electrodes and two neighboring column electrodes of the thin-film transistor substrate shown in FIG. 3. Referring to FIG. 4, as an example for explanation purpose, when the transistors of each row are activated (turned on) in sequence for displaying data, the column electrodes are also applied for delivering the electrical signal P sequentially. It should be noted that it is not necessary to activate the transistors in the array when delivering the electric power signal P. The electric power signal P may be transmitted by the column electrodes or the row electrodes with the transistors being in an inactivated (off) state. Row electrodes $S_1 \sim S_M$ transmit the scan signals, N, to activate the transistors of each row respectively. During the period when the transistors of each row being activated, each of the column electrodes $D_1 \sim D_N$ transmits electric power signals P and display data signals Y. In the present embodiment, as shown in FIG. 4, when the row electrodes $S_{M-1}$ transmits its scan signal N, the column electrode $D_{N-1}$ transmits electric power signal P; when the row electrode $S_M$ transmits its scan signal N, the column electrode $D_N$ transmits electric power signal P. Wherein, the electric power signal P is indicated by a voltage level different from that of the display data signal Y, which may be the same during implementation. It should be noted that the frequency of the electric power signal P may be different from the frequency of the display data signal Y. It may also be used for adjusting the column electrodes voltage level, such as for pre-charge purpose. This electric power signal P may be coupled and received by an external receiving unit to generate electricity.

Referring to FIGS. 1 and 2, when an user holds the electronic device 3 having a receiving unit 31 and approaches the display surface 21 of the array display device 2 (such as touching or being close to the display surface 21), the electric power signal P may be coupled from the display surface 21 of the array substrate 22 to the receiving unit 31 of the electronic device 3 by capacitive or inductive coupling. The receiving unit can thus couple and receive the electric power signal P. The distance between the array display device 2 and the electronic device 3 may be less than 1 meter. Of course, it would be better if the distance between the array display device 2 and the electronic device 3 is smaller to ensure the efficiency and accuracy of the transmission of the electric power signal P. Since the present embodiment adopts the column electrodes $D_1 \sim D_N$ to transmit electric power signal P as an example, the column electrodes $D_1 \sim D_N$ and the electrodes in electronic device 3 effectively form the electrodes in a capacitive coupling.

In this embodiment, the receiving unit 31 may have a coil, a capacitor, or an antenna. The electric power signal P is transmitted from the display surface 21 to the coil, capacitor or antenna of the receiving unit 31, and then converted into power for being used directly or stored for future use such as charging a battery of the electronic device 3 via a control circuit. To be noted, the invention transmits electric power signal P from the array display device 2 to the electronic device 3 in a wireless manner through capacitive or inductive coupling to charge the electronic device 3. Therefore, the tightness and water resistance of the housing of the electronic device 3 can be enhanced, which makes the electronic device 3 suitable for operating in a moisture-rich environment and have a longer service life.

Figure 5:
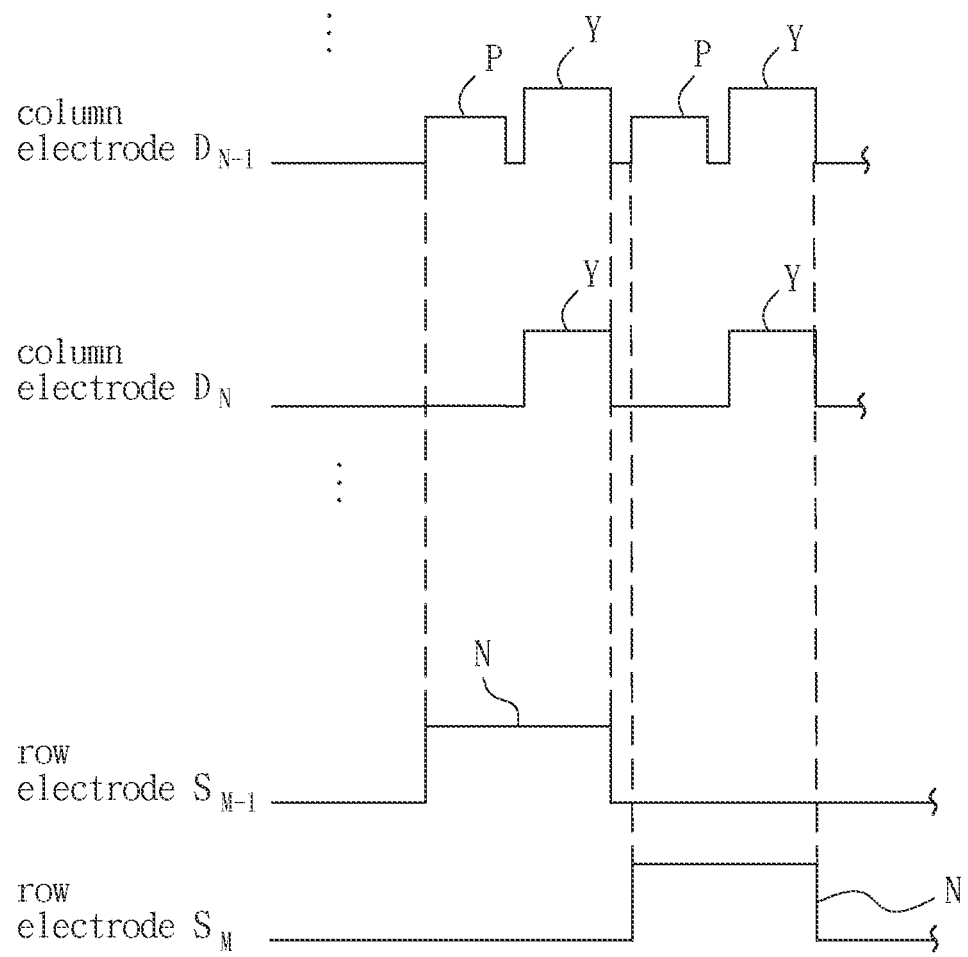
FIG. 5 is a schematic diagram showing the signals of two row electrodes and two column electrodes of the thin-film transistor substrate according to another embodiment of the invention.

FIG. 5 is a schematic diagram showing the signals of two neighboring row electrodes and two neighboring column electrodes of the thin-film transistor substrate according to another embodiment of the invention. In the array substrate 22 of the above-mentioned embodiment, in addition to the display data signal Y, each and only one column electrode $D_{N-1}$ is used for transmits the electric power signal P sequentially. In the present embodiment, each of the column electrodes $D_1$~$D_N$ transmits display data signal Y. Furthermore, one of the column electrodes, such as the column electrode $D_{N-1}$, is used to transmit the electric power signal P and the display data signal Y within each frame period and couple the electric power signal P to the electronic device 3.

Figure 6:
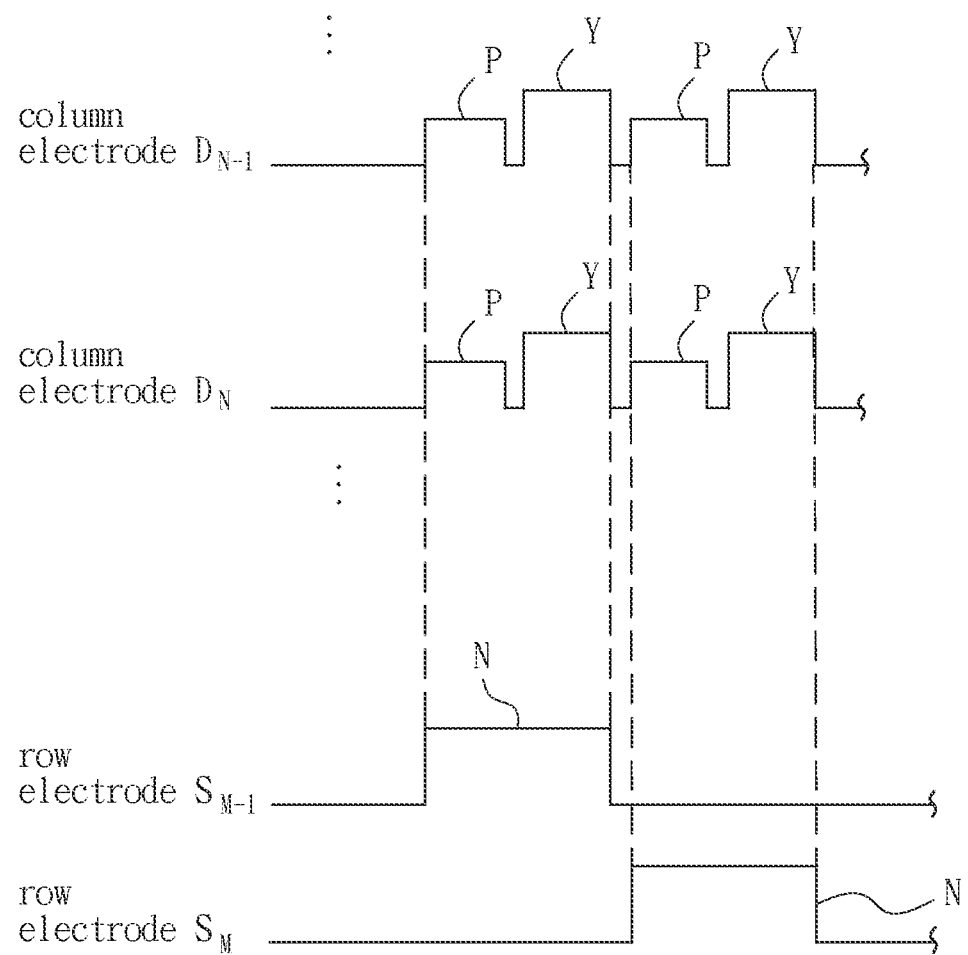
FIG. 6 is a schematic diagram showing the signals of two row electrodes and two column electrodes of the thin-film transistor substrate according to still another embodiment of the invention.

FIG. 6 is a schematic diagram showing the signals of two neighboring row electrodes and two neighboring column electrodes of the thin-film transistor substrate according to still another embodiment of the invention. In the present embodiment, the column electrodes $D_1$~$D_N$ may transmit electric power signals simultaneously when the row electrode is activated. For example, the column electrodes $D_{N-1}$ and $D_N$ transmit the electric power signal P and the display data signal Y simultaneously within each frame period, and couple the electric power signal P to the electronic device 3.

To be noted, the electric power signal P and the display data signal Y of the present embodiment are transmitted to the column electrodes $D_1$~$D_N$ by a driving chip. In another embodiment, the electric power signal P and the display data signal Y may be transmitted to the column electrodes $D_1$~$D_N$ by separate driving chips, respectively. Furthermore, the above-mentioned embodiment takes the example that the electric power signal P and the display data signal Y are transmitted to the column electrodes $D_1$~$D_N$ in different time period, respectively. However, in other embodiment, the electric power signal P and the display data signal Y may be transmitted to the column electrodes $D_1$~$D_N$ simultaneously or superimposed with each other. That is, when transmitting the display data signal Y, the electric power signal P may be also transmitted and coupled to the electronic device 3.

Figure 7:
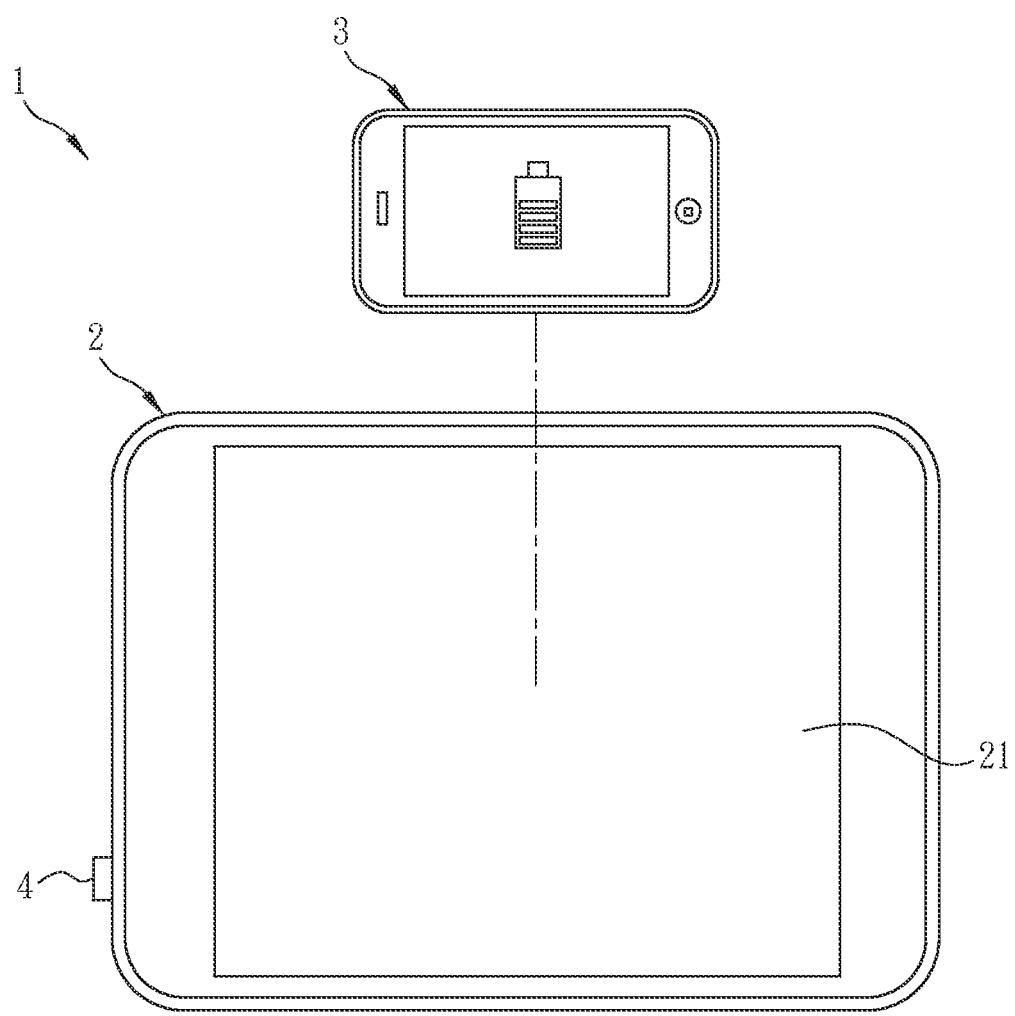
FIG. 7 is a schematic diagram showing the appearance of the wireless power transmission system according to the preferred embodiment of the invention.

FIG. 7 is a schematic diagram showing the appearance of the wireless power transmission system according to the preferred embodiment of the invention. The wireless power transmission system 1 may further include a mode-triggering module 4 which can be disposed at the array display device or the electronic device 3. Alternatively, the wireless power transmission system 1 may include separate mode-triggering modules disposed at the array display device 2 and the electronic device 3, respectively. The present embodiment takes the wireless power transmission system 1 including one mode-triggering module 4 disposed at the array display device 2 as an example, and the invention is not limited to this embodiment.

A user or the electronic device 3 may trigger the mode-triggering module 4 to activate the array display device 2 to enter into an operating mode and start transmitting the electric power signal P. Take a touch-sensitive array display device 2 as an example, through the touch input, the user can activate the mode-triggering module 4 to trigger the array display device 2 into a power transmission mode and start transmitting the electric power signal P when the user needs to transmit electric power signal P. At this moment, the row electrodes and the column electrodes may turn off all or parts of the display function of the array display device 2 to prevent unnecessary power dissipation and reduce the power consumption of the array display device. Note that the operation mode of the mode-triggering module 4 may have various working styles, such as resuming to the previous operation mode after being activated for a period of time, changing the operation mode every time upon being activated, or maintain the operation mode only under continuous activation. It should also be noted that the activation signal of the mode-triggering module 4 may come from the electronic device 3 (such as a switch on a touch pen). Under this circumstance, the electronic device 3 sends an activation signal to the mode-triggering module 4 to let the array display device 2 enter into the power transmission mode. It should be noted that the function of the so-called mode-triggering module 4 may be activated/de-activated by the touch control function via a single touch action, or activated when the user maintains the touch. The mode-triggering module 4 is not limited to locate outside the display region. It can be integrated with the display panel or the touch-sensitive panel. The mode-triggering module 4 may be, for example, a mechanical switch, a touch-sensitive switch, or a software program, etc.

In summary, since the wireless power transmission system according to the invention includes an array display device and an electronic device, the array display device couples the electric power signal from its display surface to the electronic device so that the electronic device can use the electric power signal for operations. In more detail, the electric power signal is coupled from the array substrate of the array display device to the electronic device through capacitive or inductive coupling. The electronic device receives the electric power signal using the receiving unit, and then transforms the electric power signal into a power source for direct use or into a charging power though its internal control circuit. The internal control circuit of the electronic device can charge the electronic device accordingly or store the power for future use.

Therefore, the wireless power transmission system can transmit power from a display device to an electronic device to charge the electronic device, so as to enhance the convenience of charging, reduce the use of connectors, lower the costs, and protect the environment. In addition, the water resistance and service life of the electronic device can be improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A wireless power transmission system, comprising:
an electronic device; and
an array display device, comprising:
  a substrate;
  a display surface; and
  a display matrix, wherein the display matrix comprises a plurality of row electrodes and column electrodes, the row electrodes and the column electrodes are intersected to form a two-dimensional display matrix, the display matrix is disposed on one side of the substrate, the display surface is located on another side of the substrate, and at least one of the row electrodes or at least one of the column electrodes of the two-dimensional display matrix transmits an electric power signal through the substrate and the display surface to the electronic device by wireless coupling, wherein during the row electrode or the column electrode transmitting the electric power signal through the substrate and the display surface to the electronic device by wireless coupling, at least one of the row electrodes or at least one of the column electrodes of the two-dimensional display matrix sends a display signal so the array display device displays a picture to mark the region of the electrodes for power transmissions to assist a user to perform wireless coupling;

wherein the electronic device makes use of the electric power signal for operation;

wherein the display surface is a surface of the array display device closest to a user when the user is viewing a display image of the array display device, and the display matrix is disposed on the surface of the substrate opposite to the display surface.

2. The wireless power transmission system according to claim 1, wherein the electric power signal is coupled from the array substrate to the electronic device by capacitive or inductive coupling.

3. The wireless power transmission system according to claim 1, wherein the electronic device has a receiving unit for receiving the electric power signal.

4. The wireless power transmission system according to claim 3, wherein the receiving unit has a coil or a capacitor, the electric power signal couples from the display surface to the coil or the capacitor.

5. The wireless power transmission system according to claim 1, wherein the coupling distance between the electronic device and the array display device is less than 1 meter.

6. The wireless power transmission system according to claim 1, further comprising:

a mode-triggering module, a user or the electronic device triggering the mode-triggering module to activate the array display device to enter into an operation mode to start transmitting the electric power signal.

7. The wireless power transmission system according to claim 6, wherein the mode-triggering module is disposed at the array display device.

8. The wireless power transmission system according to claim 6, wherein the mode-triggering module is disposed at the electronic device.

9. The wireless power transmission system according to claim 1, wherein the array substrate further comprises an electrode disposed outside of the display matrix to transmit the electric power signal.

10. A wireless power transmission system, comprising:
an electronic device;
an array display device, comprising:
  a substrate;
  a display surface; and
  a display matrix, wherein the display matrix comprises a plurality of row electrodes and column electrodes, the row electrodes and the column electrodes are intersected to form a two-dimensional display matrix, the display matrix is disposed on one side of the substrate, the display surface is located on another side of the substrate, and at least one of the row electrodes or at least one of the column electrodes of the two-dimensional display matrix transmits an electric power signal through the substrate and the display surface to the electronic device by wireless coupling; and a mode-triggering module, a user or the electronic device triggering the mode-triggering module to activate the array display device to enter into an operation mode to start transmitting the electric power signal;

wherein the electronic device makes use of the electric power signal for operation;

wherein the display surface is a surface of the array display device closest to a user when the user is viewing a display image of the array display device, and the display matrix is disposed on the surface of the substrate opposite to the display surface;

wherein the array display device displays an image to assist the wireless coupling.

11. The wireless power transmission system according to claim 10, wherein the electric power signal is coupled from the array substrate to the electronic device by capacitive or inductive coupling.

12. The wireless power transmission system according to claim 10, wherein the electronic device has a receiving unit for receiving the electric power signal.

13. The wireless power transmission system according to claim 12, wherein the receiving unit has a coil or a capacitor, the electric power signal couples from the display surface to the coil or the capacitor.

14. The wireless power transmission system according to claim 10, wherein the coupling distance between the electronic device and the array display device is less than 1 meter.

15. The wireless power transmission system according to claim 10, wherein the mode-triggering module is disposed at the array display device.

16. The wireless power transmission system according to claim 10, wherein the mode-triggering module is disposed at the electronic device.

17. The wireless power transmission system according to claim 10, wherein the array substrate further comprises an electrode disposed outside of the display matrix to transmit the electric power signal.

* * * * *